United States Patent [19]

Rynaski et al.

[11] Patent Number: 5,345,046
[45] Date of Patent: Sep. 6, 1994

[54] VOICE COMMUNICATION FOR ELEVATOR

[75] Inventors: Richard F. Rynaski, Middlefield; Craig Bogli, Canton, both of Conn.

[73] Assignee: Otis Elevator Company, Farmington, Conn.

[21] Appl. No.: 54,341

[22] Filed: May 3, 1993

Related U.S. Application Data

[63] Continuation of Ser. No. 902,780, Jun. 23, 1992, abandoned, which is a continuation of Ser. No. 734,403, Jul. 21, 1991, abandoned.

[51] Int. Cl.[5] .......................... B66B 3/00; G08B 21/00
[52] U.S. Cl. ..................................... 187/105; 187/140
[58] Field of Search ............... 187/105, 107, 133, 140; 340/506; 379/172, 388

[56] References Cited

U.S. PATENT DOCUMENTS

| | | | |
|---|---|---|---|
| 3,644,883 | 2/1972 | Borman et al. | 340/991 |
| 3,870,829 | 3/1975 | Chacon | 179/30 |
| 4,107,464 | 8/1978 | Lynch et al. | 179/1 B |
| 4,275,274 | 6/1981 | English . | |
| 4,482,032 | 11/1984 | Enriquez et al. | 187/105 |
| 4,622,538 | 11/1986 | Whynacht et al. | 340/506 |
| 4,682,348 | 7/1987 | Dawson et al. | 379/37 |
| 4,697,243 | 9/1987 | Moore et al. | 364/513 |
| 4,731,821 | 3/1988 | Jackson, III | 379/172 |
| 4,750,591 | 6/1988 | Coste et al. | 187/130 |
| 4,771,865 | 9/1988 | Hinderling | 187/130 |
| 4,937,855 | 6/1990 | McNab . | |
| 4,958,707 | 9/1990 | Yoneda et al. | 187/101 |
| 5,086,450 | 2/1992 | Kitagawa et al. | 379/40 |
| 5,090,052 | 2/1992 | Nakajima et al. | 379/98 |
| 5,131,508 | 7/1992 | Suzuki | 187/132 |
| 5,172,410 | 12/1992 | Chace | 379/388 |
| 5,227,776 | 7/1993 | Starefoss | 340/825.36 |

FOREIGN PATENT DOCUMENTS

| | | |
|---|---|---|
| 0252266 | 5/1987 | European Pat. Off. . |
| 0296758 | 12/1988 | European Pat. Off. ........ B66B 5/00 |
| 58-104882 | 6/1983 | Japan . |
| 2-1650 | 1/1990 | Japan . |
| 2-38278 | 2/1990 | Japan . |
| 2-86582 | 3/1990 | Japan . |
| 2-188384 | 7/1990 | Japan . |
| 2225514A | 10/1989 | United Kingdom . |

OTHER PUBLICATIONS

European Search Report dated Feb. 22, 1993.
*Operational Safety provided by the EMS Communications System*, Article by Julius Geier, published in Munich by Siemens AG, Bereich Privat- und Sonder-Kommunikationsnetze, Heft 2 (Notebook 2). English translation of German text provided. Date of Publication: Apr. 1982.
Partial European Search Report, EP 92112361, Nov. 4, 1992.
Japanese Publ. 2-182683(A)—English abstract only.

*Primary Examiner*—Thomas M. Dougherty
*Attorney, Agent, or Firm*—Francis J. Maguire, Jr.

[57] ABSTRACT

Upon detection of a trapped passenger in an elevator car, a resident monitoring device initiates communication between the car and a telephone in the building and between the car and a remote monitoring center. Upon detection of the first responsive telephonic communication from either the remote monitoring center or the telephone in the building, voice communication is established therebetween. Upon detection of a second responsive telephonic communication from the second location to respond, voice communication is established between the car and the second location as well so that simultaneous communication may be conducted between the car, the remote monitoring center, and the telephone in the building. A building telephone has a keypad which can be used to select another car for voice communication with a trapped passenger by pressing a selected key. A telephone ring voltage source is provided for alerting building personnel of a trapped passenger. A dual-tone, multi-frequency decoder is provided for determining which keypad button is depressed.

2 Claims, 6 Drawing Sheets

VOICE COMMUNICATION FOR ELEVATOR

This is a continuation of copending application(s) Ser. No. 07/902,780 filed on Jun. 23, 1992, which is a continuation of Ser. No. 734,403 filed on Jul. 21, 1991; both now abandoned.

TECHNICAL FIELD

This invention relates to elevators and, more particularly, to providing a voice circuit between an elevator car, a remote operator and a building superintendent during an elevator emergency or elevator failure mode.

BACKGROUND ART

There are failure modes of elevator systems that result in passengers of elevators being trapped inside the elevator car. During this trapped passenger state, we have used remote monitoring to provide relief by means of two-way conversation between the elevator passengers and an attendant of the elevator system, e.g., via a dial up modem. A resident building monitor device makes a determination that there is a trapped passenger and dials a preconfigured telephone number to report the condition. A personal computer in a central monitoring center, which answers the call from the resident device, displays the trapped passenger alarm, building name and address plus the master identification and elevator number. The PC then prompts the operator to "pick-up" the handset. Immediately upon picking up the telephone, the operator will be talking to the trapped passenger. There is presently no facility to provide the operator with simultaneous knowledge as to any other cars which have trapped passengers in the same group of (up to eight) elevators in the building. When the operator hangs up the handset from the first voice contact, if there is a second trapped passenger pending, the PC will then display the second trapped passenger alarm and prompt pickup of the handset. This scenario will continue depending on how many trapped passenger conditions exist. All of the alarms and concomitant voice contacts will be accomplished in a single phone call. The resident device is in control of which elevator the operator converses with, based on the order the alarms are received.

In our system, the monitoring center attendant contacts a serviceman and provides assurances to the passenger while waiting for the arrival of the serviceman. This provides more comfort to the passenger than other systems in which communication is merely provided with the building superintendent. However, when the serviceman arrives he is unable to easily inform the passenger or the remote attendant of his arrival. In other systems, such as shown in Japanese Kokai 2-188384, communication is provided between the trapped passenger and either the remote attendant or the local building manager's office.

DISCLOSURE OF INVENTION

The object of this invention is to provide capability for equipping a building with a handset for communicating with a trapped passenger and with a monitoring center.

According to the present invention, a three way voice gateway is provided as an integral portion of a remote voice system. The method is to provide such a voice gateway into a remote voice system.

In our remote monitoring system, for example, we have previously provided communications between a monitoring center and the remote site by means of electronic hardware either added to older, relay logic type elevators or we have embedded our monitoring and voice logic in new elevators. So it will be understood that in the description which follows we will show an implementation of the present invention as an improvement to our existing hardware approaches. The software required to carry out the present invention may similarly constitute a part of add-on hardware or be already embedded in the product when sold. Thus, the detailed disclosure which follows will have many features which are unique to our own systems. However, the underlying principles are applicable to elevator monitoring in general.

The methodology for upgrading our existing approach is to add a telephone within the building. If, in response to a ringing thereof, the additional telephone is not picked up, then the upgraded system works as before without the upgrade. In other words, the trapped passenger talks only to the monitoring center operator.

If a trapped passenger alarm exists and the monitoring center operator has not picked up yet, the act of picking up the additional phone's handset initiates a voice contact to the trapped passenger. The communication will be with the first trapped passenger car detected by the resident monitoring device. If the # key is depressed, the handset will be put into communication to the next detected trapped passenger car, if any. If the # key depression occurs while voice is active with the last received trapped passenger alarm, the resident device will roll over the voice contact back to the first received trapped passenger car. Additionally, if while the phone is off-hook, a digit on the handset is pressed, the voice link will be enabled to the elevator number selected by the digit. The voice switch frequency at the handset is limited to one switchover every two seconds.

When a trapped passenger is detected by the resident device, the alarm and associated voice contact is established. Anywhere through this sequence, the additional handset can be picked up. The system proceeds to deliver the alarm to the monitoring center and go into voice, while responding to the handset as described above. When voice is established between the building and monitoring center modems, the monitoring center will be talking to whichever elevator has been selected by the additional handset.

As long as the handset is off-hook, the system responds as described immediately above. If the handset goes on-hook for 5 seconds, control reverts to the way the system worked before, without the additional handset. Control is regained by the handset if a digit is pushed or by going on-hook and then off-hook again.

These and other objects, features and advantages of the present invention will become more apparent in light of the following detailed description of a best mode embodiment thereof, as illustrated in the accompanying drawing.

BEST MODE FOR CARRYING OUT THE INVENTION

Existing elevator monitoring systems monitor each car in a building and transmit alarm and performance information back to a remote monitoring center, a local office or both. The remote monitoring center or local office is responsive to such information transmitted from a large number of buildings and is in communication with a network of servicemen deployed to respond to calls for help on instant notice.

In designing hardware for monitoring each car in a relay-based system, for example as shown in U.S. Pat. No. 4,568,909, it may be convenient to use a number of slaves interconnected with a communications bus and outfit one of the slaves as a master not only for monitoring its own car by means of sensors but for evaluating the information gathered by the slaves for the other cars and for communicating the information to interested parties. In this way, a number of cars can use the same signal processing and communications hardware as well as associated software.

The detailed example which follows is implemented for such a master but it should be realized that the example is merely an implementation of the basic principles of the voice gateway which are applicable to other elevator monitoring systems which use different hardware approaches.

The method of voice communication between any one or more inoperative elevators and the monitoring center may, for example, be the public telephone switched circuit network whereby the monitoring system may identify the inoperative elevators and establish a voice connection through the public switch, to a local office. The method of voice communication that we show, in this embodiment, between the elevator car and other points is therefore influenced by this choice and should similarly not be thought of as a limitation on the claimed invention.

Figure 1:
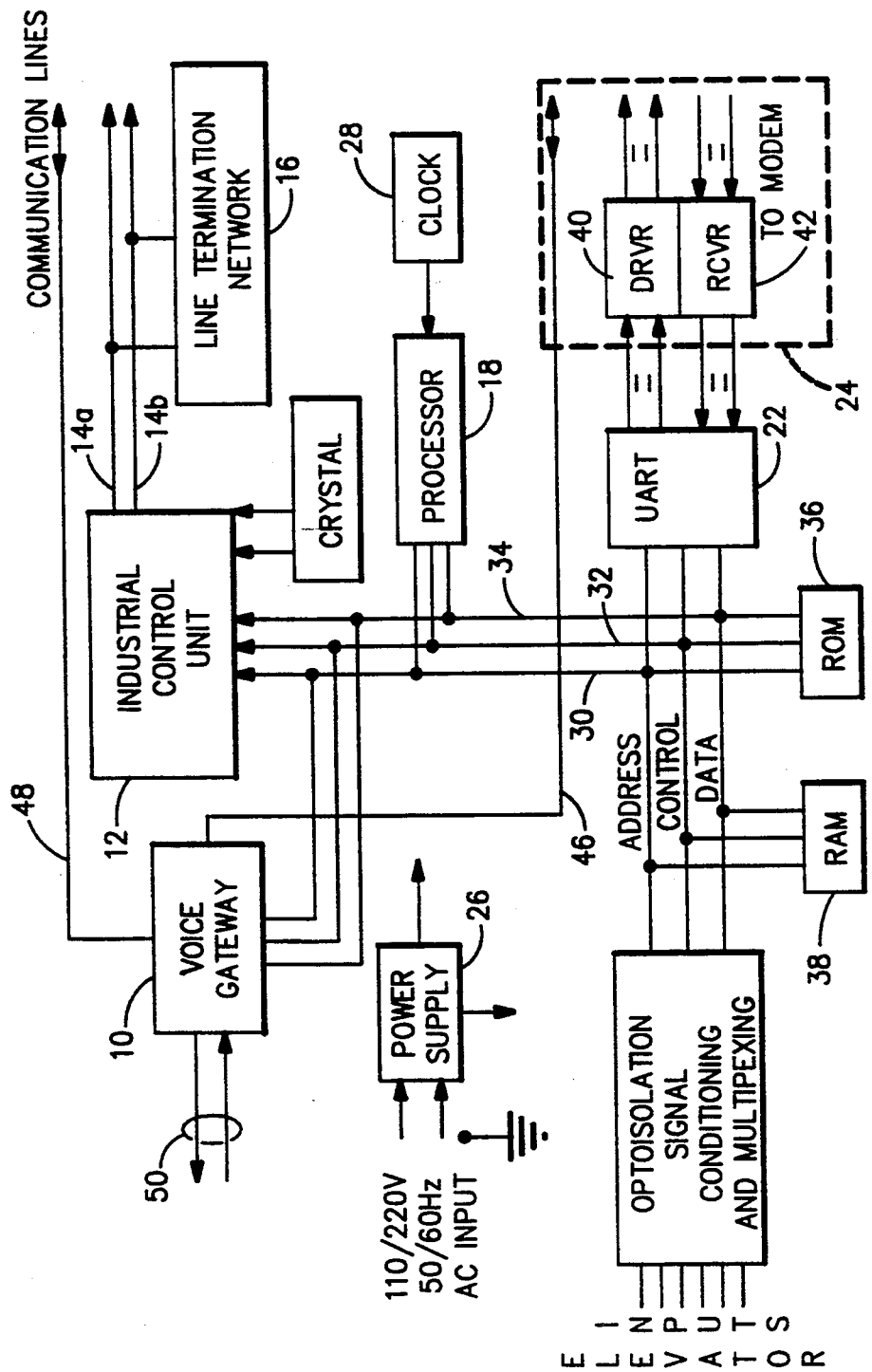
FIG. 1 is a block diagram showing a voice gateway used, according to the present invention, for example, in a master which may be used to communicate both with individual car slaves and a remote monitoring center.

FIG. 1 illustrates a voice gateway 10, according to the present invention, interfaced in this case with the remainder of the hardware in FIG. 1, in the form of a master, such as we use for communicating with a remote site and with a number of slaves in a building.

A master/slave communication unit 12 which we also call an industrial control unit (as shown in detail in U.S. Pat. No. 4,622,551) for receiving input information on the status of the elevators from each of the slaves at regular intervals and supplying same to the monitoring center. The information is transmitted on a communication line 14a, 14b which is connected to the slaves in the building. The lines 14a, 14b are terminated with a line termination network 16 connected close to the unit 12 to provide filtering for error free communication in a high-noise environment. The far end of the line is similarly terminated.

The information is processed by a signal processor 18 to determine, for example, if an alarm condition such as a trapped passenger is present. Alarm condition criteria and acceptable limits for daily performance data are defined according to Boolean logic equations coded within the software of the signal processor. Such may be implemented in a state machine, for example, as shown in U.S. Pat. No. 4,622,538 or, as shown in U.S. Pat. No. 4,750,591.

A universal asynchronous receiver transmitter (UART) 22, which may be part of the processor 18, is used to communicate with and control a modem 24. In addition, circuitry is contained within the master to provide real time clock interrupts associated with counting and measuring of unit intervals of time for the purpose of determining alarm conditions and maintaining the correct time of day. A power supply 26 to the master is shown as being 110/220 V. at 50/60 Hz. The outputs of the power supply may be a regulated five-volt supply and a ±twelve-volt supply, for example, to provide all of the power for the logic which is contained within the master, and also an unregulated 24-volt supply may be sent to all of the slaves associated with the particular master. A clock 28 consists of a crystal control oscillator which provides all the synchronous clocking information for the master system circuitry.

Interfaced to the processor 18 on address lines 30, control lines 32, and data lines 34, is a Read Only Memory 36, which may also be erasable, programmable read only memory. Contained within this memory are all of the logic functions associated with the performance of the master as detailed elsewhere. In addition, a Random Access Memory 38 is provided for temporary data retention. This memory can be written and read from the processor 18 to/from the master/slave communication interface. Contained within the RAM memory is a common storage area which is used to pass information between the master/slave communication interface 12 and the signal processor 18. This common memory area is accessed by the processor under software control to obtain the latest input data from each elevator. This input data is rewritten in registers of memory in the processor 18 to become what is known as the "bit map" of the input data. Detection of a change in state of one of the bits in the bit map is used in the logical flow of predetermined algorithms to determine the presence of an alarm condition and/or significant performance associated with the bit change. Upon detection of an alarm condition, such as a trapped passenger, the processor will forward a specific alarm message to a central monitoring center or a local monitoring center. The message is sent from the processor 18 to the modem 24 via the UART 22 which provides the necessary formatting and control signals for operation of the modem. Data is transmitted from the UART to a driver circuit 40. Received back from the modem are received data from a receiver circuit 42. When a master is ready to transmit a message through the modem, an initialization sequence is sent to the modem. Subsequently, a response is received from the modem indicating to the processor that the modem has been initialized and is prepared to dial. At that point, a dialing sequence is sent from the processor to the modem which consists of a command function to dial followed by the necessary digits to call the monitoring center. After the dialing sequence, the processor will wait for the reception of a data set ready signal from the modem. This occurs once the modem has completed the dialing cycle and has received a carrier back signal. The master is then ready to transmit the message to the monitoring center detailing the alarm condition for performance data. Upon transmission and reception of the message at the monitoring center, an acknowledgement signal will be received. At that time, the processor will "hang up" the modem, and the modem disconnects from the monitoring center and clears the telephone line.

In the event of a trapped passenger, the monitoring software will detect same and transmit a trapped passenger message to the monitoring center. At the same time, according to our invention, the voice gateway causes a touch tone phone to ring in or near the building so the building superintendent may be made aware of the problem. The processor 18 causes the ICU 12 to enable a speaker and microphone in the affected car. If the building superintendent answers the phone, he will be placed in voice communication with the trapped passenger. Also, he may choose to talk to the occupants of a different car by pressing selected buttons on the keypad of the touch tone phone, as described in detail below in connection with FIG. 2. After the trapped passenger alarm is transmitted to the message center, the monitoring personnel will want to dispatch a serviceman and establish voice communication with both the trapped passenger and the building superintendent. The voice gateway 10, according to the present invention, permits such a three way conversation to occur. The monitoring center will be enabled to join an already established conversation between the superintendent and the trapped passenger or will be able to establish first contact if the superintendent failed to answer his phone.

Figure 2:
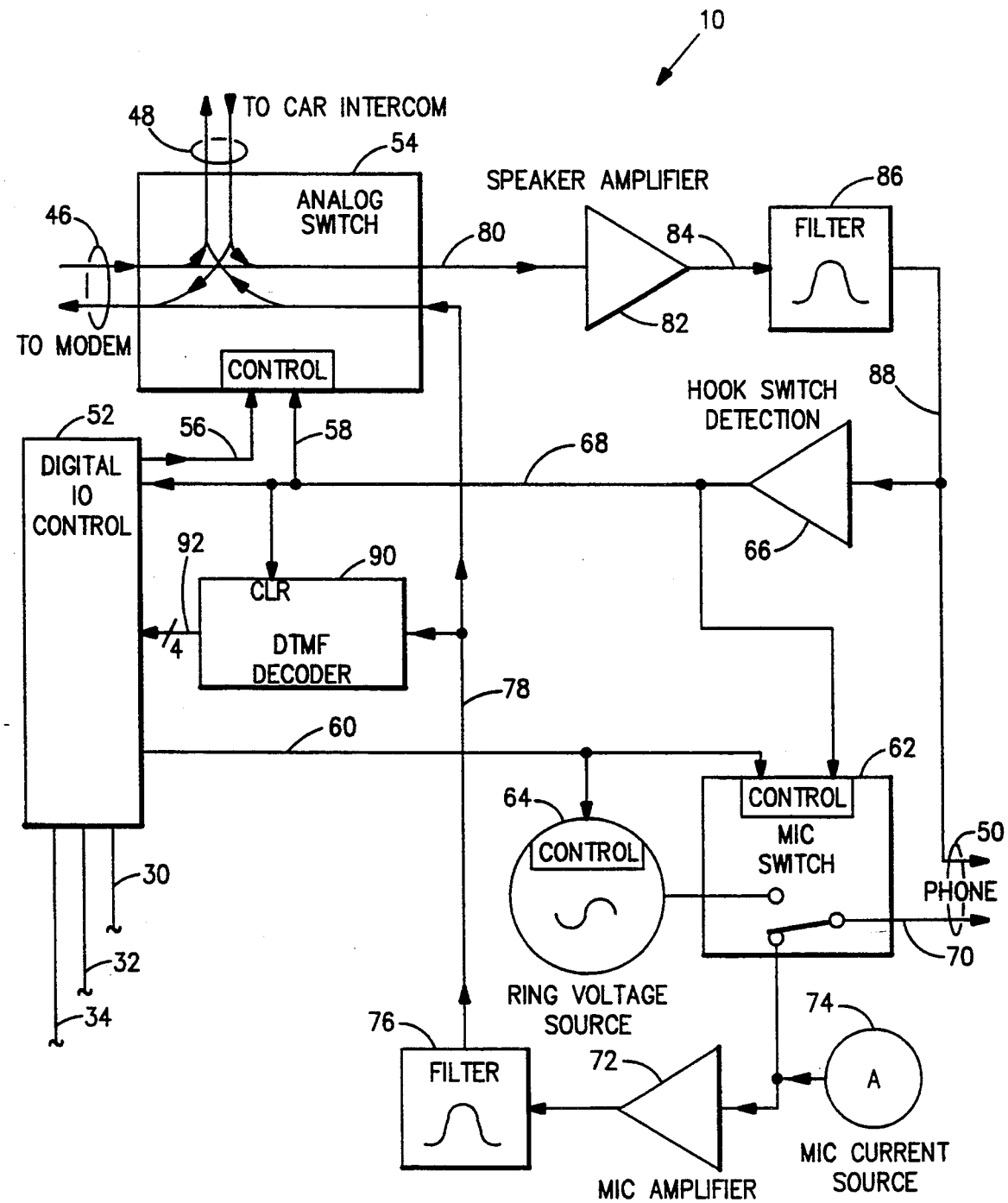
FIG. 2 is a block diagram of a voice gateway, according to the present invention.

FIG. 2 shows the voice gateway of FIG. 1 in detail. There, a digital Input/Output (I/O) device 52 may be part of the processor 18 of FIG. 1 and be responsive to and provide control signals for controlling an analog switch 54 which controls either two-way or three-way conversations between the elevator car and either or both of the superintendent's office phone and a phone in the remote monitoring center. The analog switch may be designed to first provide, upon receiving a signal on a line 56, voice communications over lines 48 from the elevator car with a trapped passenger and over lines 50 to the superintendent's office, and then, upon receiving a control signal on a line 58 prompted by a request from the monitoring center, providing additional voice communication over line 46 from the monitoring center. The analog switch may simply effect the summing of the signals on the line 46 for summation with the voice communication signals existing between the car and the superintendent's office. This might typically be at the input of non-inverting summing amplifiers (not shown). Upon receiving a trapped passenger message, the monitoring center will cause the processor 18 to send a message over lines 30, 32, 34 to the digital I/O control 52 in order to cause the control 52 to provide the control signal on the line 56 to the analog switch 54 to establish voice communication between the car and the superintendent's office. At the same time, the processor 18 will enable the speaker and the microphone in the car by means of commands to ICU 12. The digital control 52 will also provide a control signal on a line 60 to a microphone switch 62 which will cause a switch to connect a ring voltage source 64 activated by the signal on line 60, to provide a ring voltage to the superintendent's phone. After pick-up of the phone, a hook switch detection circuit 66 will provide a signal on a line 68 to the control 52 indicating that the superintendent has picked up his phone and the control 52 will cause the signal on the line 60 to be deactivated. At that point, the ring voltage source will be disconnected and deactivated. The superintendent may speak into his microphone in his handset and will provide a voice signal on a line 70 to an amplifier 72 driven by a current source 74. After filtering by filter 76, a filtered voice signal is provided on a line 78 to the analog switch 54 for transmission to the trapper passenger in the affected car for annunciation on a speaker therein. Similarly, the trapped passenger may speak into a microphone located in the car over a signal line 80 amplified by an amplifier 82 which provides an amplified signal on a line 84 to a filter 86 for filtration whereby the trapped passenger's voice signal is sent to the speaker in the superintendent's handset.

A dual-tone multi-frequency (DTMF) decoder 90 is responsive to touchtone inputs from a touchtone-type phone in the superintendent's office for allowing the superintendent to select a different car with which he wishes to speak. The digital control 52 is responsive to a decoded signal on a line 92 (representing four lines in this case) which then transmits a digital signal on lines 30, 32, 34 to the processor 18 whereby the processor signals the industrial control unit 12 to enable the speaker and microphone in the selected car for connection to the analog switch 54 in place of the car originally connected by the processor in response to the trapped passenger message.

Figure 3:
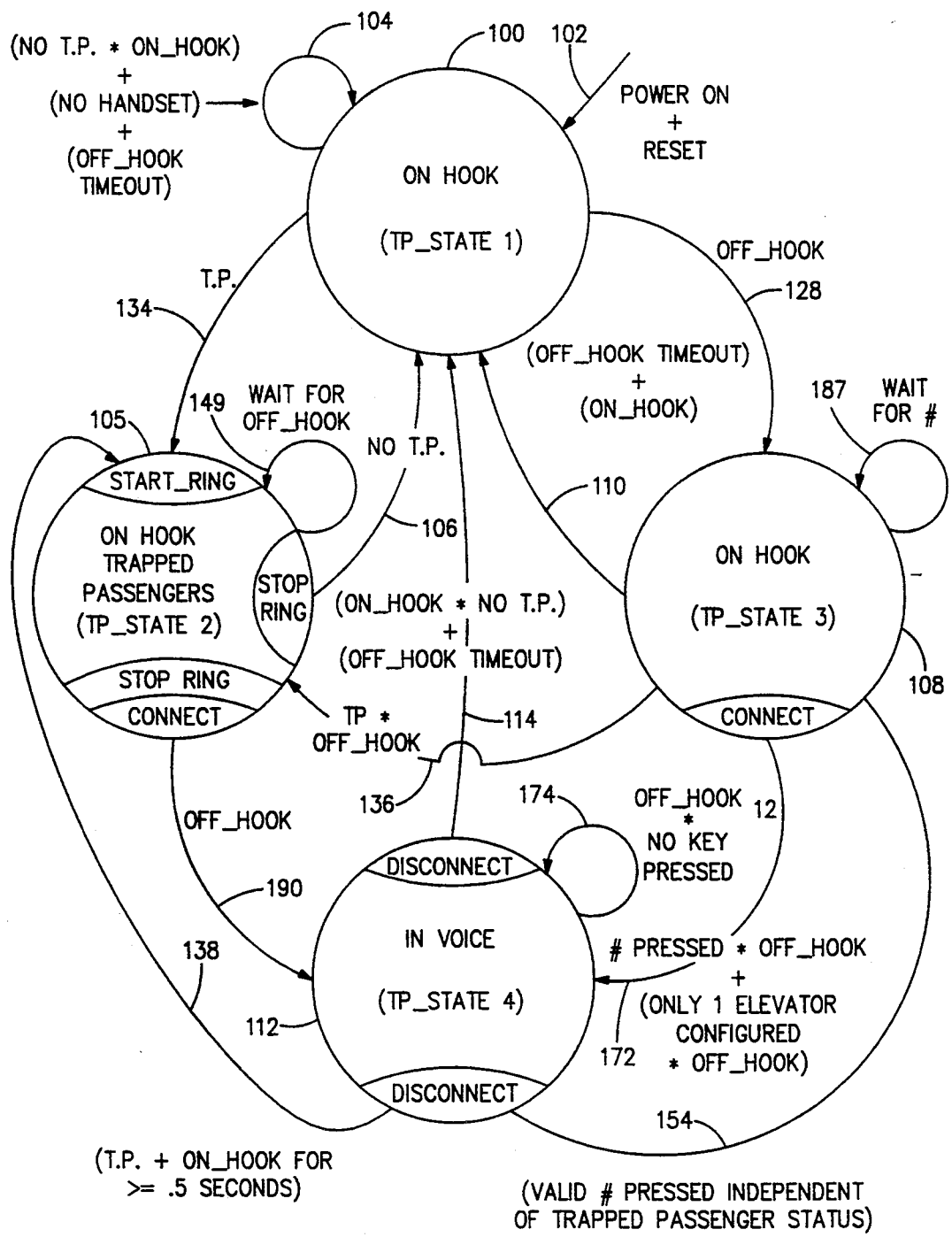
FIG. 3 is a simplified flowchart diagram illustrating the steps executed by the processor in a state machine for controlling the voice gateway of FIG. 2.

FIG. 3 is a simplified flowchart diagram illustrating the steps the voice gateway software executes to control the voice gateway hardware. The voice gateway software may be resident in the ROM 36. There are signals within the remote monitoring operating system which affect the operation of the voice gateway. These signals are evaluated by the processor 18 of FIG. 1 which compares the present received signals to values indicative of specific system conditions to determine if any signal has entered a state indicative of a transition from the present operating condition to another operating condition.

Thus, the presence or absence of certain elevator alarms is monitored. The state of the voice gateway hardware is also monitored. Thus a voice gateway "state machine" is created which greatly reduces the complexity and burden of control of the voice gateway hardware by the remote monitoring operating system.

Each state that the voice gateway can assume is represented graphically in FIG. 3 by a circle. Mnemonics used within a circle identify the state. All permissible transitions between states of the voice gateway are represented graphically by transition lines with arrowheads in between circles. Each transition is qualified by an expression whose value is either true or false. The voice gateway remains in its current state if all the expressions which qualify the transitions leading to the other states are not satisfied. The new state is entered immediately after a transition criterion becomes fully satisfied. An expression may consist of one or more variables joined by logical operators AND, OR, or NOT. The AND operator is represented by the symbol *. The OR operator is represented by the symbol +. Parentheses are used to clarify precedence.

A simplified description of the operation of the voice gateway state machine follows. Each state in the diagram of FIG. 3 will be described along with the requirements and conditions for transition out of the state to another succeeding state.

Upon application of power or reset to the remote monitoring system, a state 100 which we call the TP_STATE1 is entered, as indicated by transition line 102 in FIG. 3. The TP_STATE1 state functionally represents an inactive superintendent's handset, inactive because the handset is on-hook, or it has been off-hook for more than two minutes and additionally no keys have been pressed during the two minute interval or because it has been entered from other states indicative of no activity.

Thus, after the voice gateway state machine enters the TP_STATE1 it will stay there, as indicated by a self transition line 104, as long as:

(no trapped passenger (NO TP) alarms occur and the superintendent's handset in on-hook)
OR
(the system operating system has detected a voice gateway hardware error)
OR
(the superintendent's handset has been off-hook for more than two minutes and no keys are pressed).

The TP_STATE1 state 100 may also be entered from a TP_STATE2 state 105 when a trapped passenger (TP) condition is no longer detected, as indicated by transition line 106 in FIG. 3. The TP_STATE1 state may also be entered from a TP_STATE3 state 108 when the (superintendent's handset has been off-hook for more than two minutes and additionally no keys have been pressed during this two minute period)
OR
(the superintendent's handset is on-hook)

as indicated by a transition line 110 in FIG. 3. The TP_STATE1 state 100 may also be entered from a TP_STATE4 state 112 when (the superintendent's handset in on-hook and no TP is detected)
OR
(the superintendent's handset has been off-hook for $>=2$ minutes, and additionally no keys have been pressed during this two-minute period), as indicated by transition line 114 in FIG. 3.

Figure 4:
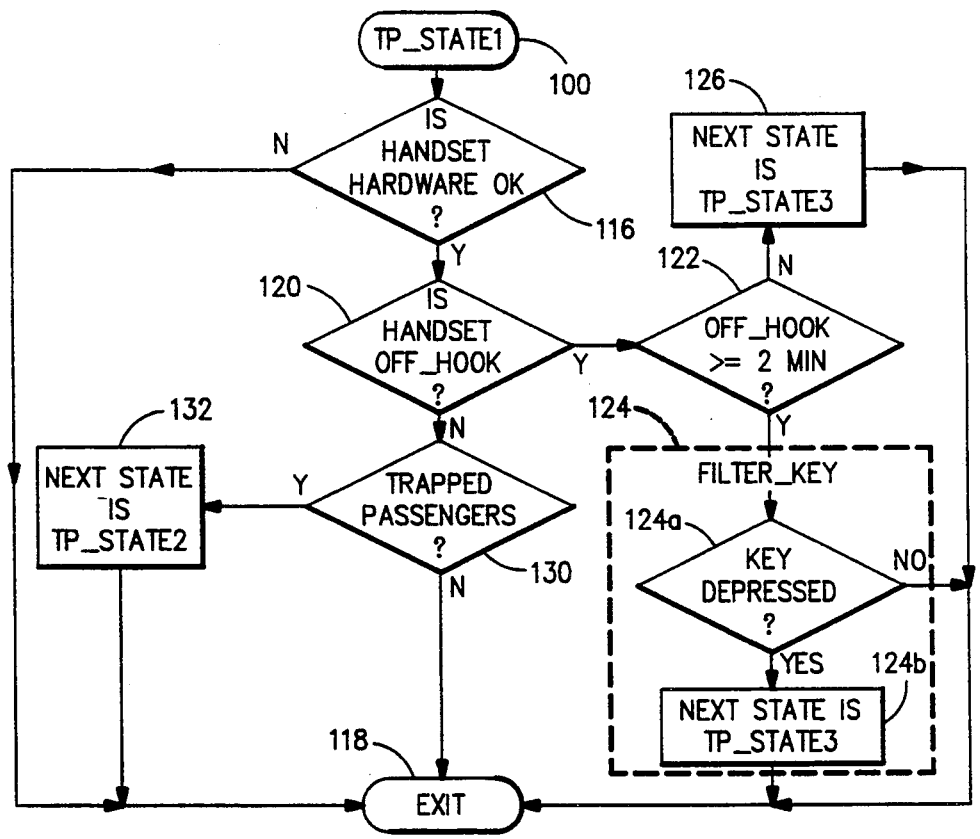
FIG. 4 is a simplified flowchart diagram of the TP_STATE1 state of FIG. 3 which is executed by the processor in determining if the voice gateway must be activated.

Referring now to the flowchart of FIG. 4, the TP_STATE1 state begins with a TEST_HARDWARE instruction 116 which determines if the voice gateway hardware is faulty. If so, the program branches to an instruction 118 to exit TP_STATE1 and re-enter as indicated by transition line 104.

If the voice gateway hardware is not faulty, instruction 116 branches to an instruction 120 which tests if the superintendent's handset is off-hook. If the superintendent's handset is off-hook, instruction 120 branches to an instruction 122 which checks if the superintendent's handset has been off-hook for more than two minutes and additionally no keys have been pressed during this two-minute period. If the two-minute timer test is successful, the program branches to a "filter key" instruction 124 to check for keypad key depression on the superintendent's phone. If a keypad key depression is detected in a step 124a, TP_STATE 3 is established, as indicated in a step 124b, as the next state. Next, instruction 118 is executed to exit TP_STATE1.

If the two-minute timer test 122 is not successful, the program branches to an instruction 126 which establishes TP_STATE3 as the next state as indicated by a transition line 128 in FIG. 3. The program then branches to instruction 118 to exit TP_STATE1 and enter the TP_STATE3, i.e., the state 108.

If instruction 120 detects that the superintendent's handset is on-hook, the program branches to an instruction 130 which checks if there is a trapped passenger (TP) present. If there is a TP, an instruction 132 establishes TP_STATE2 as the next state 105. The program then branches to instruction 118 to exit TP_STATE1 and enter TP_STATE2 as indicated by a transition line 134 in FIG. 3.

If instruction 130 in FIG. 4 detects there is no TP present, the program branches to instruction 118 to exit TP_STATE1 but enters again as indicated by transition line 104 in FIG. 3.

The TP_STATE2 state 105 is entered from the TP_STATE1 state as described in the previous paragraphs and indicated by transition line 134 in FIG. 3. The TP_$STATE$2 state 105 is also entered from the TP_STATE3 state 108 when a TP occurs and the superintendent's handset is off-hook, as indicated by a transition line 136 in FIG. 3. The TP_STATE2 state 105 is also entered from the TP_STATE4 state 112 when a TP occurs and the superintendent's handset goes from off-hook to on-hook for more than 0.5 second as indicated by a transition line 138 in FIG. 3.

Figure 5:
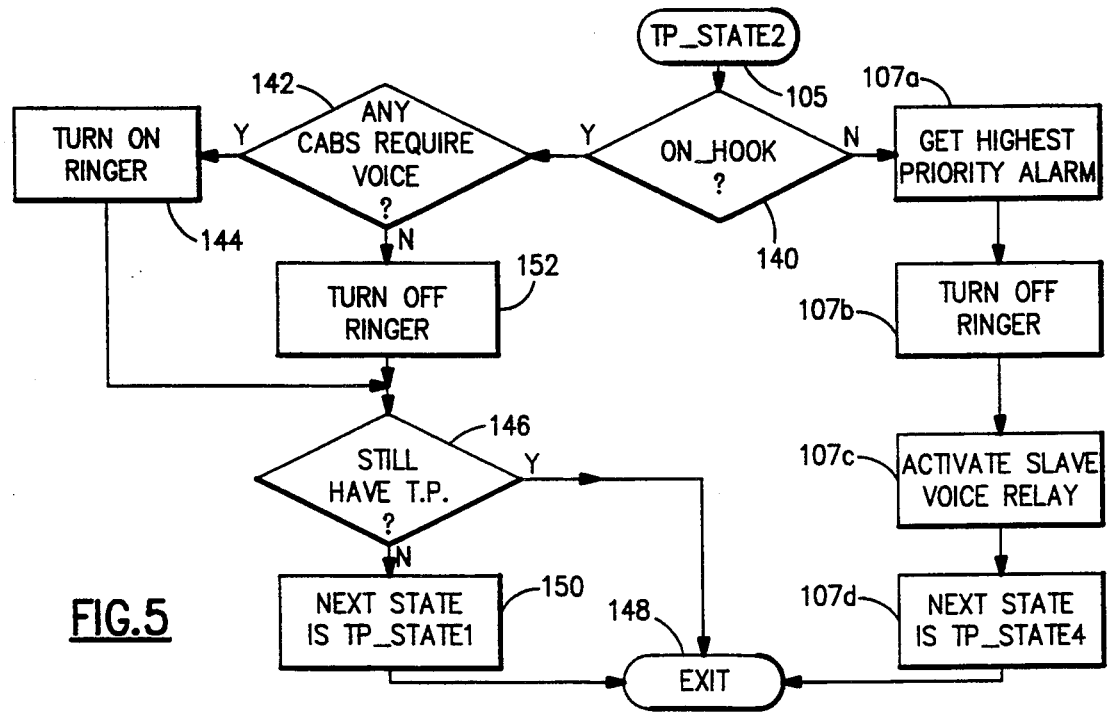
FIG. 5 is a simplified flowchart diagram of the TP_STATE2 state of FIG. 3 which is executed by the processor in determining when the telephone handset goes off-hook and there are alarm conditions.

FIG. 5 details the operation of the voice gateway state machine state 105, called "ON HOOK" or TP_STATE2. TP_$STATE$2 begins with an instruction 140 which checks the condition of the superintendent's handset. If the handset is on-hook, the program branches to an instruction 142 which checks if any voice relays, associated with any cars (slaves) have not been activated yet. We now look for any cab in which there is a trapped passenger and in which voice has not yet been established. If we find such a cab, the program branches to instruction 144 which causes the superintendent's handset to ring. The program then branches to an instruction 146 which checks to see if there is a TP. If there is a TP, the program branches to an instruction 148 to exit TP_STATE2, as indicated in a transition line 149 which simply causes a re-entry to state 105. If there is no TP, the program branches to an instruction 150 to establish TP_STATE1 100 as the next state.

If the instruction 142 does not detect any cabs that require voice, the program branches to an instruction 152 which turns off the superintendent's handset ringer. The next instruction 146 checks to see if there is a TP. Again, if there is a TP, the program branches to the instruction 148 to exit TP_STATE2 via the transition line 149. If there is no TP, the program branches to the instruction 150 to establish TP_STATE1 as the next state. Instruction 148 is then executed to exit TP_STATE2, and a transition is made as indicated by the transition line 106 in FIG. 3.

If instruction 140 determines the handset is off-hook, an instruction 107a is executed to determine which elevator has the highest priority alarm. An instruction 107b is then executed to turn the handset ringer off. An instruction 107c is then executed to activate that elevator voice relay which has the highest priority. An instruction 107d is then executed to establish TP_STATE4 as the next state.

The TP_STATE3 state 108 is entered from the TP_STATE1 state 100 as described in the previous paragraphs and indicated by the transition line 128 in FIG. 3. The TP_STATE3 state 108 is also entered from the TP_STATE4 state 112 when a valid elevator number is pressed on the superintendent's handset, as indicated by a transition line 154 in FIG. 3.

Figure 6:
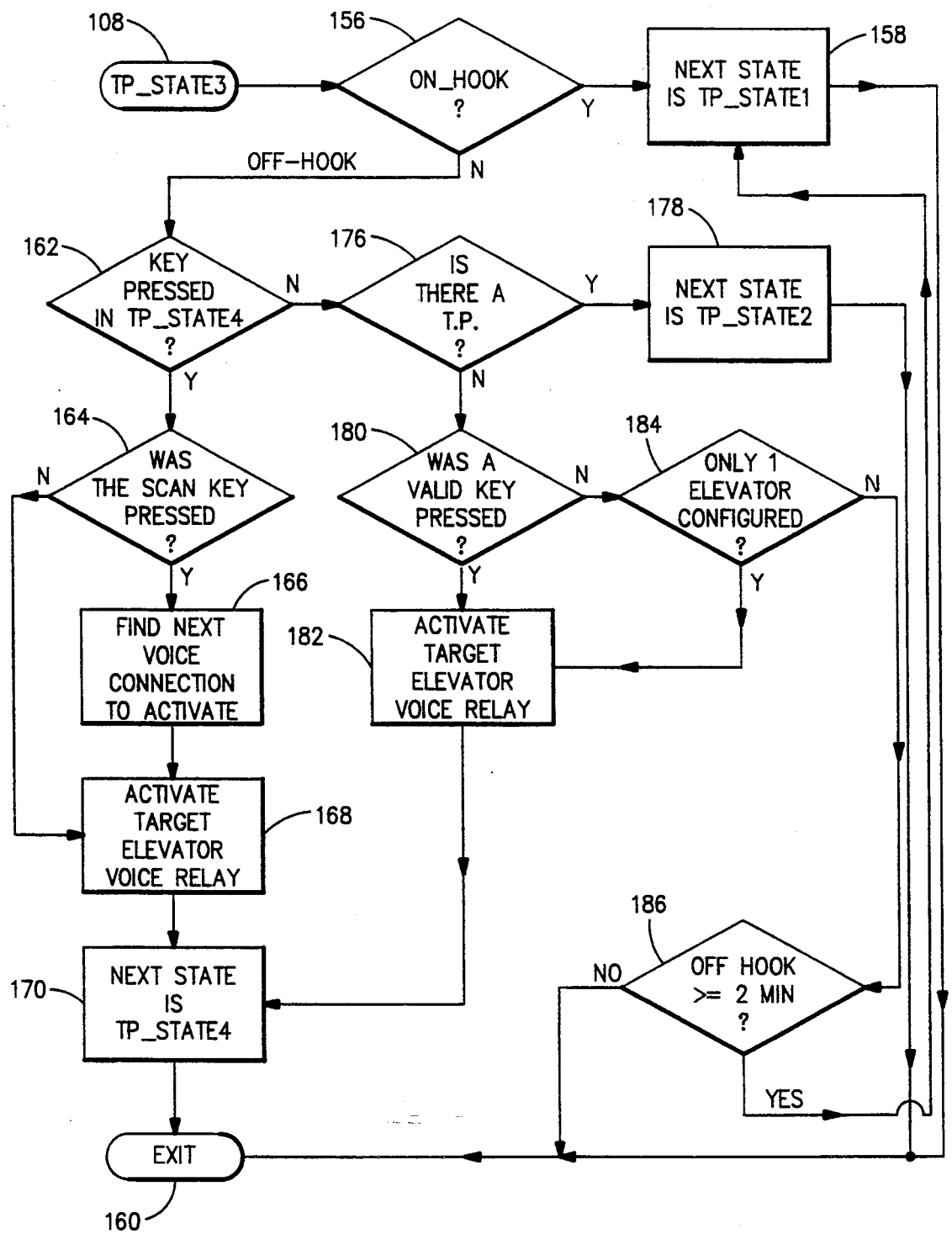
FIG. 6 is a simplified flowchart diagram of the TP_STATE3 state of FIG. 3 executed by the processor in determining when the telephone handset goes off-hook and there are no alarm conditions.

FIG. 6 details the operation of the voice gateway state machine state 108, called TP_STATE3. TP_STATE3 begins with an instruction 156 which determines if the superintendent's handset is on-hook. If the superintendent's handset is on-hook, the program branches to an instruction 158 to establish TP_STATE1 100 as the next state. An instruction 160 is then executed to exit TP_STATE3.

If the superintendent's handset is not on-hook, the program branches to an instruction 162 which tests if the previous state was TP_STATE4 and if true, if a key was pressed while in TP_STATE4. If true, the program branches to an instruction 164 to determine if the key pressed was the "#" key. If true, an instruction 166 is executed which determines the elevator with the highest priority TP alarm. Next, an instruction 168 is executed to activate that elevator's voice connection. Next, an instruction 170 is executed to establish TP_STATE4 as the next state. The instruction 160 is then executed to exit TP_STATE3 and a transition is made to the TP_STATE4 112, as indicated by a transition line 172 in FIG. 3.

If instruction 164 determines that the scan key was not pressed, the program skips instruction 166 and branches to the instruction 168 to activate the selected elevator voice connection. Next, the instruction 170 is executed to establish TP_STATE4 112 as the next state. Instruction 160 is then executed to exit TP_STATE3 but to return immediately thereto as indicated by a return transition line 174 in FIG. 3.

If instruction 162 determines that a key was not pressed in state 112, the program branches to an instruction 176 which tests if there is a TP. If there is a TP, the program branches to an instruction 178 to establish TP_STATE2 105 as the next state. Instruction 160 is then executed to exit TP_STATE3 and transition to the TP_STATE2 105 as indicated by the transition line 136 in FIG. 3.

If instruction 176 determines there is no TP, the program branches to an instruction 180 which tests if a new key was pressed. If a new key was pressed, an instruction 182 is executed to activate the selected elevator's voice connection. Next, the instruction 170 is executed to establish TP_STATE4 112 as the next state. Instruction 160 is then executed to exit TP_STATE3 and a transition to state 112 is made as indicated by the transition line 172 in FIG. 3.

If instruction 180 determines no new key was pressed, the program branches to an instruction 184 which determines the number of configured elevators. If only one elevator is configured (predetermination of number of cars in building), instruction 182 is executed to actuate the elevator's voice relay. Next, the instruction 170 is executed to establish TP_STATE4 112 as the next state Instruction 160 is then executed to exit TP_STATE3 and enter state 112 as indicated by the transition line 172 in FIG. 3.

If instruction 184 determines that more than one elevator is configured, the program branches to an instruction 186 which tests if the superintendent's handset has been off-hook for more than two minutes and additionally no keys have been pressed during the two-minute interval. If the two-minute timer test is successful, the program branches to the instruction 158 to establish TP_STATE1 100 as the next state. Next, instruction 160 is executed to exit TP_STATE3 108 and enter state TP_STATE1 100 as indicated by the transition line 110.

If the two-minute timer test fails (instruction 186), the program branches to the instruction 160 to exit TP_STATE3 and re-enter as indicated on a line 187 in FIG. 3.

The TP_STATE4 state is entered from the TP_STATE2 state as described in the previous paragraphs and indicated by a transition line 190 in FIG. 3. The TP_STATE4 state is also entered from the TP_STATE3 as described in the previous paragraphs and indicated by the transition line 172 in FIG. 3.

Figure 7:
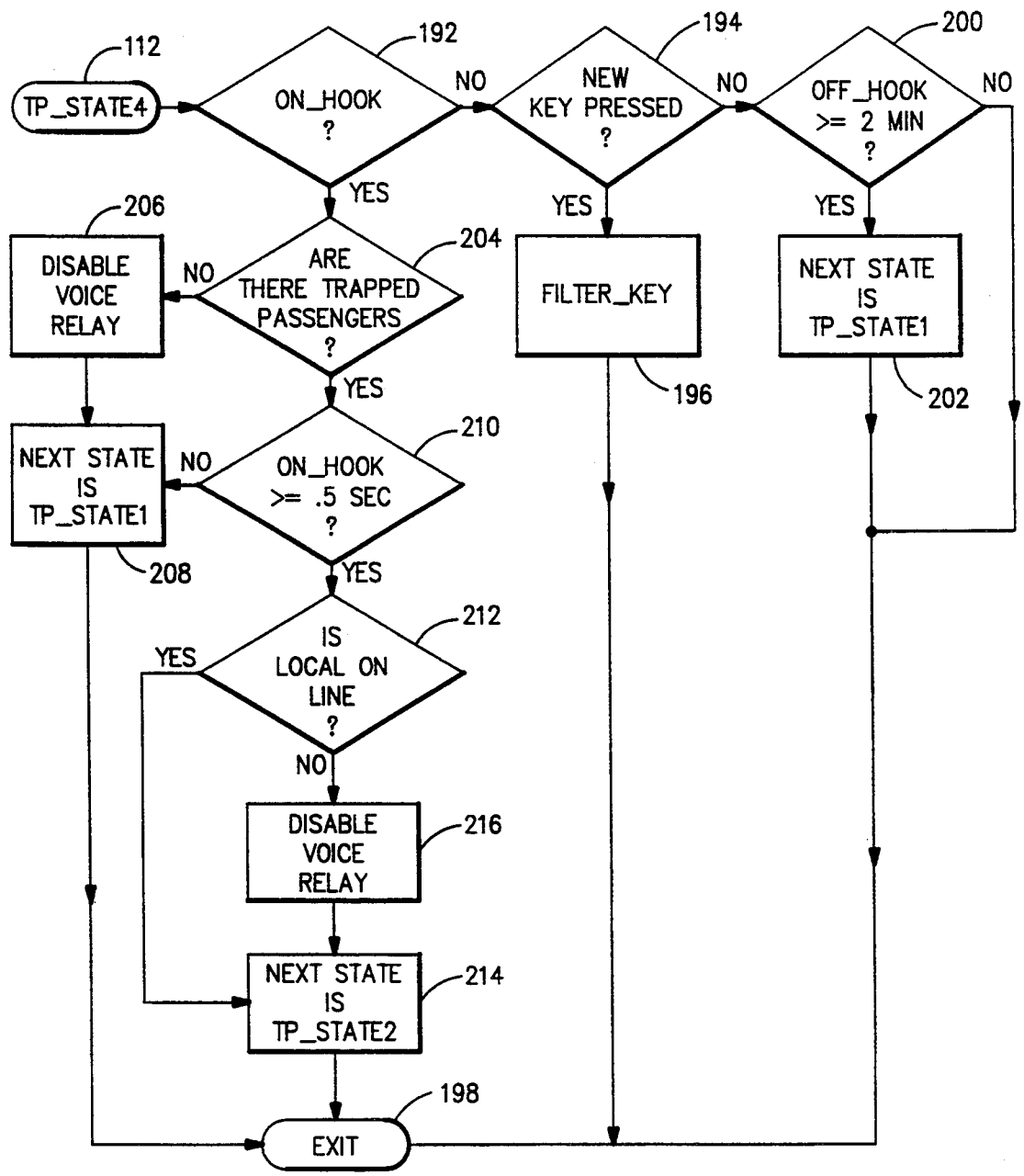
FIG. 7 is a simplified flowchart diagram of the TP_STATE4 state of FIG. 3 executed by the processor in determining when the telephone handset goes on-hook.

FIG. 7 details the operation of the voice gateway state machine state 112, called TP_STATE4. TP_STATE4 begins with an instruction 192 which determines if the superintendent's handset is on-hook. If the superintendent's handset is not on-hook, the program branches to an instruction 194 which determines if a new key was pressed. If a new key was pressed, the program branches to an instruction 196 to process the keystroke. Instruction 196 is similar in function to that of step 124 of FIG. 4. Thus, an instruction 198 is executed to exit TP_STATE4 and enter the state TP_STATE3, if the key is depressed, and will exit and re-enter TP_STATE4 otherwise.

If instruction 194 determines that no new key was pressed, the program branches to an instruction 200 which tests if the superintendent's handset has been off-hook for more than two minutes and additionally no keys have been pressed during the two-minute interval. If the two-minute timer test is successful, the program branches to an instruction 202 to establish TP_STATE1 as the next state. Instruction 198 is then executed to exit TP_STATE4 and enter state TP_STATE1. If the two-minute timer test 200 is not successful, instruction 198 is executed to emit TP_STATE4 via transition line 174 for immediate re-entry into TP_STATE4.

If instruction 192 determines that the superintendent's handset is on-hook, the program branches to an instruction 204 which tests if there is a TP. If not true, the program branches to an instruction 206 to disable all elevator voice connections. An instruction 208 is then executed to establish TP_STATE1 as the next state and an exit is made thereto as indicated by the step 198 and the transition line 114 of FIG. 3.

If instruction 204 determines there is a TP, the program branches to an instruction 210 which tests if the superintendent's handset has been on-hook for more than one-half second. This acts as a hook-flash filter. A hook-flash may be defined as a brief period during which a user depresses the handset switch manually. If true, the program branches to an instruction 212 which checks if any elevator's voice connection is already established. If true, the program branches to an instruction 214 to establish TP_STATE2 105 as the next state. Next, instruction 198 is executed to exit this state.

If instruction 212 finds that there is no voice connection to any elevator, the voice relays are disabled in a step 216 and instruction 214 is executed to establish TP_STATE2 as the next state. Instruction 198 is then executed to exit this state and enter state 105.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

What is claimed is:

1. Apparatus for ringing a telephone in a building having at least one elevator with a trapped passenger, comprising:

control means (18), responsive to a trapped passenger signal (30, 32, 34) indicative of a trapped passenger in the elevator car, for providing a communications initiating signal (60);

a ring voltage source (64), responsive to the initiating signal, for providing a ring voltage signal;

a switch (62), responsive to the initiating signal, for providing the ring voltage signal for annunciating the telephone;

a hook switch detector (66), responsive to a handset switch indicative of the telephone handset being picked up or the telephone being otherwise answered, for providing an off-hook signal; and an analog switch (54), responsive to the off-hook signal, for providing a voice communication signal path between the telephone and the car.

2. The apparatus of claim 1, wherein the switch (62) is responsive to the off-hook signal for providing a microphone signal from the telephone to the communication signal path, and wherein the apparatus further comprises a dual-tone, multi-frequency decoder (90), responsive to a key signal indicative of a key depression, for providing a control signal (92) for providing a voice communication signal path between the telephone and another car having a trapped passenger.

* * * * *